April 26, 1932.   C. F. CAPELL   1,855,383
AUTOMATICALLY CONTROLLED FUEL ATOMIZING DEVICE
Filed Sept. 22, 1930   3 Sheets-Sheet 1
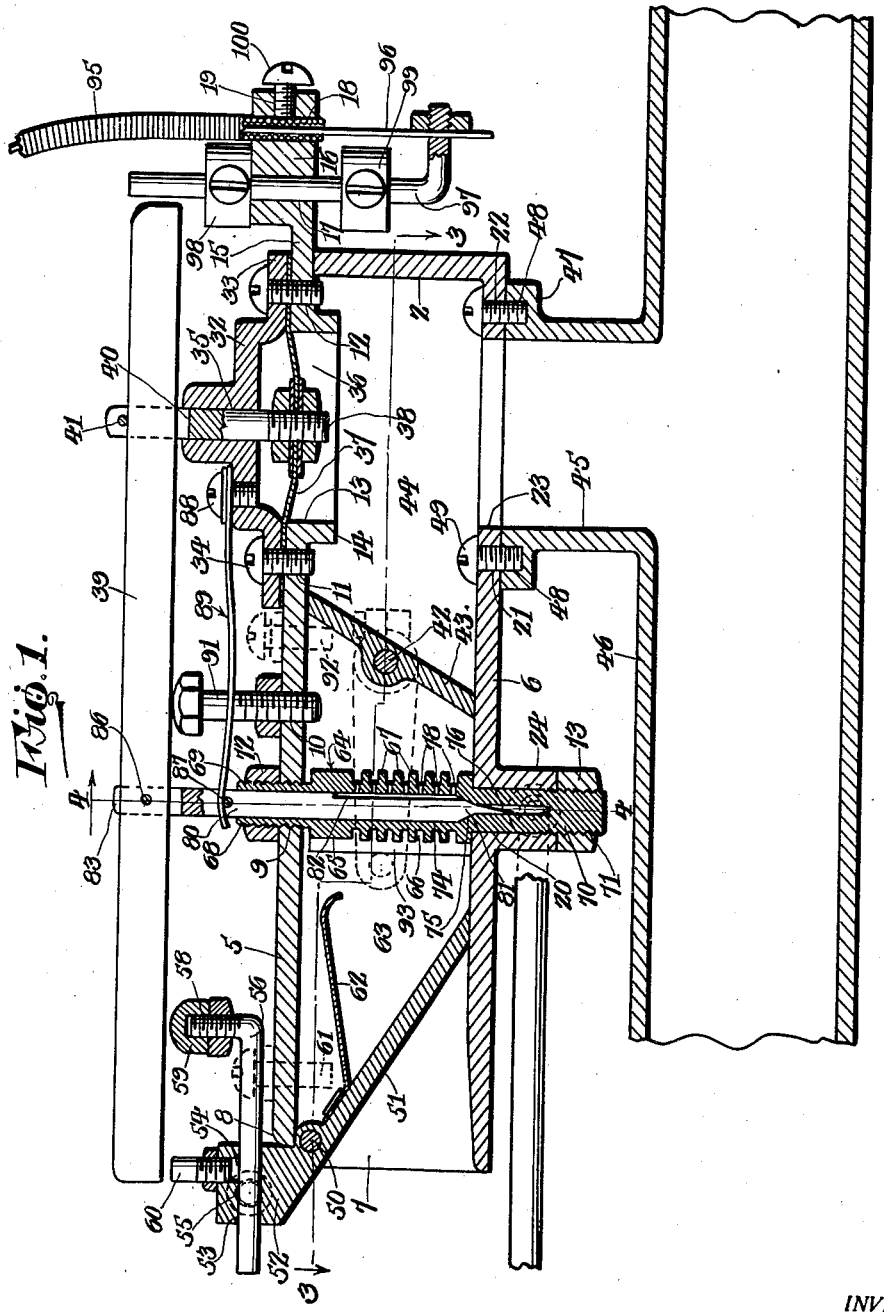
INVENTOR.
Carl F. Capell
BY
Geo. P. Kimmel
ATTORNEY.

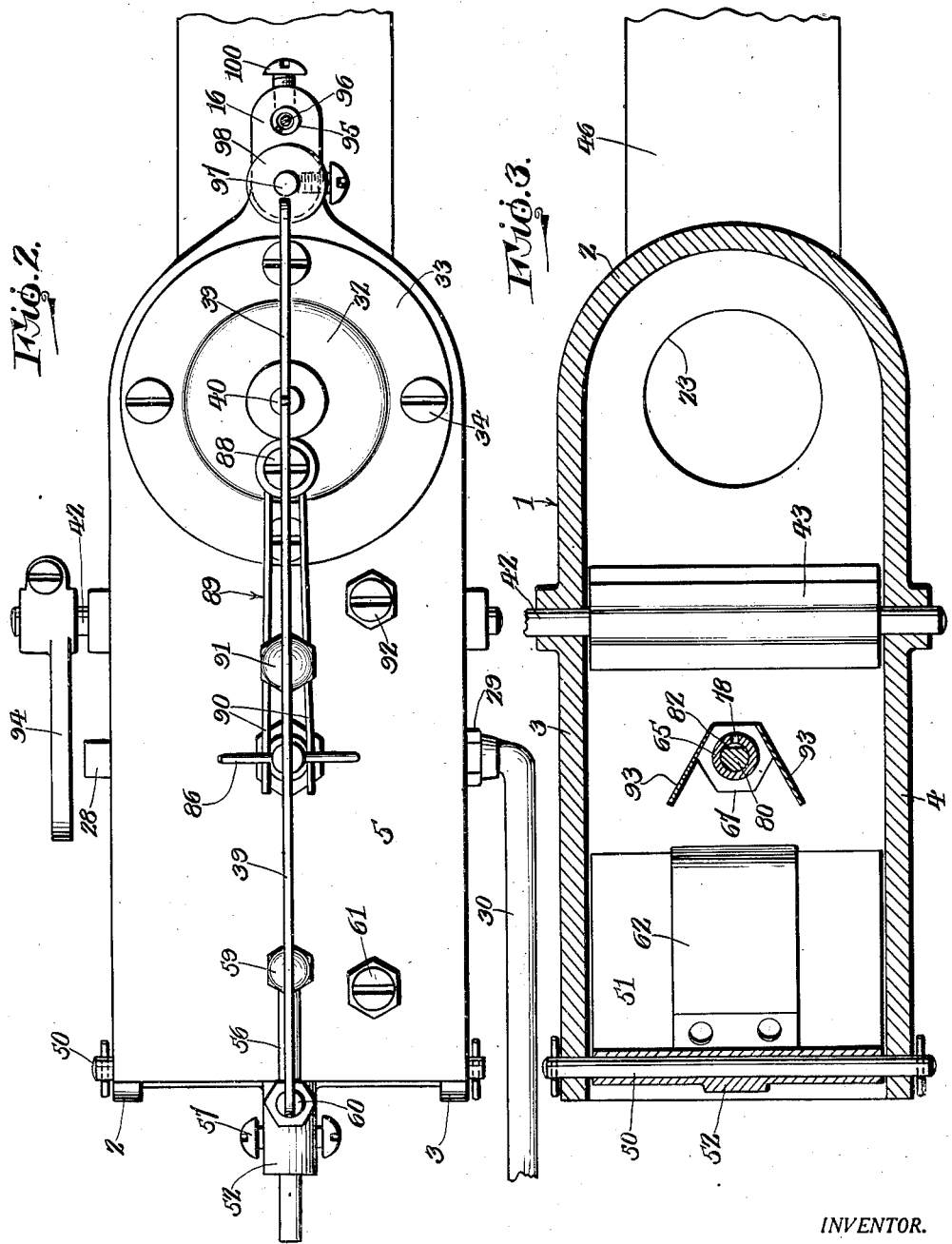

April 26, 1932.  C. F. CAPELL  1,855,383
AUTOMATICALLY CONTROLLED FUEL ATOMIZING DEVICE
Filed Sept. 22, 1930   3 Sheets-Sheet 3
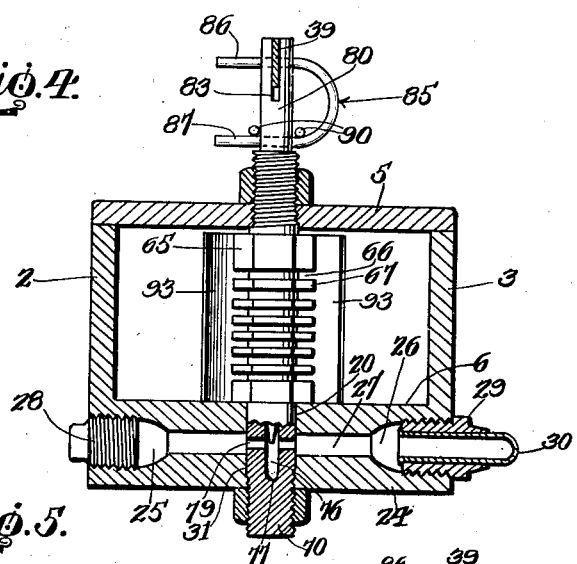
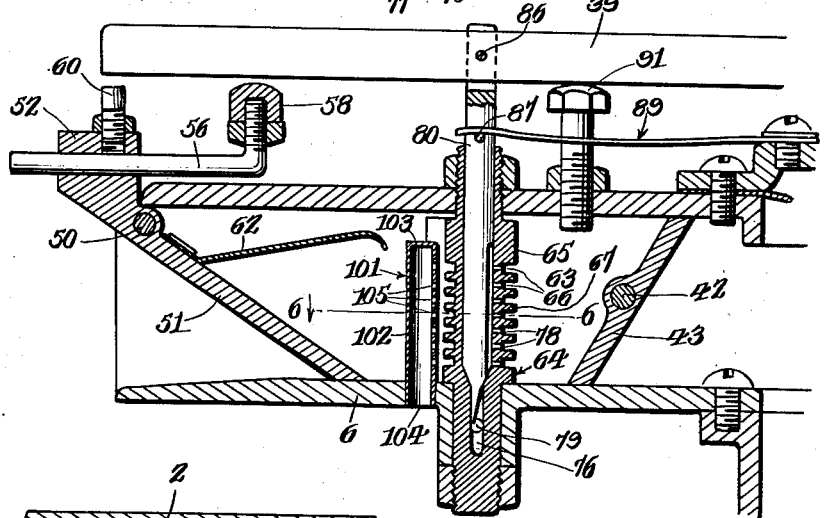
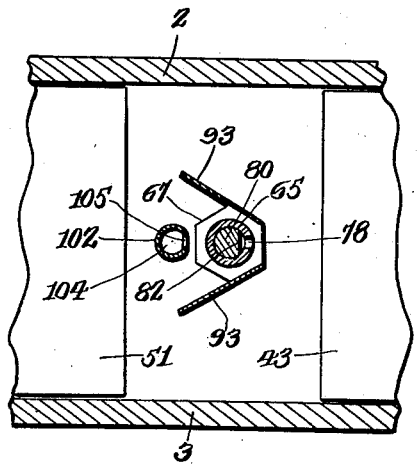
INVENTOR.
Carl F. Capell
BY
Geo. P. Kimmel
ATTORNEY.

Patented Apr. 26, 1932

1,855,383

UNITED STATES PATENT OFFICE

CARL F. CAPELL, OF SANTA MONICA, CALIFORNIA

AUTOMATICALLY CONTROLLED FUEL ATOMIZING DEVICE

Application filed September 22, 1930. Serial No. 483,737.

This invention relates to an automatically controlled fuel atomizing device for use in connection with internal combustion engines in place of the type of carburetors now being generally employed, and has for its object to provide, in a manner as hereinafter referred to for automatically forcing, as the suction of the engine is increased liquid fuel through an atomizing element for admixture with air to constitute a combustible mixture for delivery to the intake manifold of the engine.

A further object of the invention is to provide, in a manner as hereinafter set forth, a device of the class referred to including a mixing chamber having a controlled liquid fuel atomizing element extending therein, and with one wall of said chamber provided by a suction operated air intake controlling valve and another wall of the chamber provided by a throttle valve, the latter acting to control the discharge of the combustible mixture from said chamber into the intake manifold of the engine.

A further object of the invention is to provide, in a manner as hereinafter set forth, a device of the class referred to including a dry mixing chamber, both in vacuum and semi-vacuum compartments and for delivery from said chamber a substantially perfect mixture of the combustible type to the intake manifold of the engine.

A further object of the invention is to provide, in a manner as hereinafter set forth, a device for the purpose referred to so constructed and arranged to dispense with the employment of a float operated controlling valve, as the float is open to the objection that it is affected by vibration thereby delivering various mixtures allowing liquid fuel to enter the motor, which is detrimental to lubrication.

A further object of the invention is to provide, in a manner as hereinafter set forth, a device for the purpose referred to including means to provide for quick starting of the engine or motor when occasion requires and without the necessity of racing the engine or motor.

Further objects of the invention are to provide, in a manner as hereinafter set forth, an automatically controlled fuel atomizing device for the purpose referred to which is simple in its construction and arrangement, strong, durable, compact, thoroughly efficient in its use, readily installed with respect to the intake manifold of an internal combustion engine or motor, automatic in its action, adjustable, quickly assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a longitudinal sectional view of an automatically controlled fuel atomizing device in accordance with this invention and showing the adaptation thereof with respect to the intake manifold of an internal combustion engine.

Figure 2 is a top plan view of the device.

Figure 3 is a section on a line 3—3 of Figure 1.

Figure 4 is a section on a line 4—4 of Figure 1.

Figure 5 is a fragmentary view in longitudinal section of a modified form of an automatically controlled fuel atomizing device in accordance with this invention.

Figure 6 is a section on a line 6—6 of Figure 5.

Referring to Figures 1 to 4 both inclusive of the drawings, the device includes a substantially rectangular housing referred to generally at 1 and which is formed at one end with a rounded wall 2, a pair of side walls 3, 4, a top wall 5 and a bottom 6. The other end of housing 1 is open as at 7. The top wall 5 terminates adjacent the ends of the side walls 3, 4 at the open end 7 of housing 1, as indicated at 8.

The top wall 5 is formed with spaced openings 9, 10, 11, and 12 and the walls of such openings are threaded. The top wall 5 between the openings 11 and 12 is provided with an opening 13 of materially greater diameter than the diameter of any of the other of said openings and integral with the inner face of top wall 5 and registering with the wall of opening 13 is a depending collar 14. That end of the top wall 5 which is seated upon the end wall 2 is provided centrally thereof with a laterally extending projection 15 having an enlarged part 16 formed with parallel spaced openings 17, 18 and a longitudinally extending opening 19 which communicates with the opening 18.

The bottom 6 is formed with openings 20, 21, 22 and 23. The opening 23 is arranged between and spaced from openings 21, 22 and is of materially greater diameter than any of the other openings in said bottom. The opening 20 is of greater diameter than the openings 21, 22 and the walls of the openings 21, 22 are threaded. Depending from and formed integral with the lower face of bottom 6 is a transversely extending rib 24 provided at each end with a concavity disposed lengthwise thereof and such concavities are indicated at 25, 26. The rib 24 is furthermore formed with a lengthwise extending channel 27 which opens at its ends into the concavities 25, 26. Adapted to be connected with rib 24 are liquid fuel supply lines and as illustrated but one line is shown as coupled with rib 24 and such line opens into the concavity 26. As illustrated the concavity 25 is closed by a plug 28. Secured to the wall of the concavity 26 is a tubular plug 29 which carries a liquid fuel supply line 30, the latter extending from a suitable source of supply. Extending through the rib 24, centrally thereof as well as intersecting the channel 27 is an opening 31, and the latter aligns with the opening 9 and communicates with opening 20.

Seated upon and connected to the top wall 5, and the housing 1 is an inverted cup shaped member 32 provided with an annular flange 33 through which extends holdfast devices for anchoring the member 32 to housing 1. The holdfast devices are indicated at 34 and engage with the threaded walls of the openings 11, 12. The top of the member 33 is formed with a centrally disposed opening 35. The member 32 in connection with the opening 13 and collar 14 provides a diaphragm chamber 36 and extending across the latter and interposed between flange 33 and top wall 5 is a suction operated resilient diaphragm 37. Anchored at its lower end with the diaphragm 37, centrally thereof, and extending up through the opening 35 is an actuating element 38 for a rocker arm 39. The upper end of the element 38 is bifurcated at at 40 and into which extends the arm 39. A stop 41 is secured to the upper end of the element 38 and confines the arm 30 within the furcation at the upper end of said element 38. The arm 39 is of a length to project beyond both ends of the housing 1 and is arranged a substantial distance thereabove. The holdfast devices 34 constitute means for securing the diaphragm 37 in position with respect to the chamber 36.

Journaled in the side walls 2, 3 of the housing 1 and positioned between the openings 9 and 11 and 20 and 21 is an operating shaft 42 for a throttle valve 43 of the gate type and which is formed with beveled ends for the purpose of snugly engaging the inner faces of the top wall 5 and bottom 6 of housing 1 when the valve 43 is in closed position. When valve 43 is in closed position it inclines relatively to housing 1 and the inclination is towards the diaphragm chamber 36. The valve 43 in connection with the top wall 5, bottom 6, diaphragm 37 and end wall 2 forms a suction chamber 44 into which opens the diaphragm chamber 36. The outlet for the suction chamber 44 is provided by the opening 23 and the latter has its wall register with a branch 45 of an intake manifold 46. The branch 45 is flanged as at 47 and is formed with sockets 48 having the walls thereof threaded. The sockets 48 register with the openings 21, 22 and extending through the openings 21, 22 and engaging in the sockets 48 are holdfast devices 49.

Journaled in the side walls 2, 3 of the housing 1 in proximity to the open end 7 is a pivot shaft 50 for a suction operated air intake valve 51. The valve 51 is arranged within the housing 9, between the openings 20 and the open end 7. The valve 51 projects beyond the top wall 5 of housing 1 and is formed with an upstanding enlarged extension 52 provided with a longitudinally extending opening 53, a vertical opening 54 and a pair of traverse openings 55, only one of which is shown. An adjustable angled shaped rod 56 is carried by the extension 52. The rod 56 is termed a lifting element, is mounted in opening 53 and adjustably secured to extension 52 by set screws 57 which engage in the transverse openings 55. The lifting element is adjustable lengthwise with respect to housing 1. The shorter arm of the lifting element is indicated at 58 and is vertically disposed. Carried by the arm 56 is a resilient head 59 which provides the contact for the rocker arm 39. The head 59 is adjustably secured to the arm 38. A head post 60 is adjustably secured in the vertical opening 54 of the extension 52 and the purpose of the head post will be presently referred to. The action of the head 59 relative to the rocker arm 39 will also be presently referred to.

Carried by the top wall 5 and depending therefrom is an adjustable stop 61 for controlling the opening movement of the intake valve 51. Secured to the intake valve 51 and adapted to engage the inner face of the top wall 5 of housing 1 is a flexible member 62 functioning as a flexible contact between valve 51 and top wall 5 when the throttle valve 43 is opened quickly.

The valves 43, 51 in connection with top wall 5, bottom 6, and side walls 2, 3 provide a mixing chamber 63 and into which the atomizing element, to be presently referred to, opens.

The liquid fuel atomizing element referred to generally at 64 comprises a body part 65 of polygonal contour formed intermediate its ends with a series of spaced endless grooves 66 forming a set of spaced parallel flanges 67. Integral with the upper end of body part 65 is a reduced extension 68 having peripheral threads 69. Integral with the lower end of body part 65 is a reduced extension 70 of greater length than the length of the extension 68 and formed with peripheral threads 71. The extension 68 projects through opening 9, threadedly engaged with the wall of the latter and extends a substantial distance above the top wall 5 of housing 1. The opening 30 registers with the opening 20 and the extension 70 projects through openings 20 and 30 and depends a substantial distance below the rib 24. Threadedly engaging with the extension 68 and abutting the top wall 5 is a securing nut 72. Threadedly engaging with extension 71 and abutting against the rib 24 is a securing nut 73. The securing nuts 72, 73 in connection with the rib 24 and the lower end of body part 65 fixedly secures the atomizing element 64 to the housing 1 and in a position extending across the mixing chamber 63 between the valves 43 and 51. The element 64 is spaced from the valves 43 and 51.

The element 64 is formed with a centrally disposed channel 74 which extends through extension 68 to the lower end of body part 65 and the wall of the channel 74 at the lower end of body part 65 is beveled to provide the valve seat 75. The extension 70 is formed with a channel 76 closed at its lower end as at 77 and with the closed end of the channel 76 spaced a substantial distance from the lower end of the extension 70. The element 64 between the flanges 67 and at one side of body part 65 is formed with outlet ports 78 which lead from channel 74. The extension 70 is provided with lateral ports 79 which lead from the channel 76 and open into the channel 27. Ports 79 provide intake ports for the element 64 and the ports 78 provide outlets for element 64.

Slidably operating in the element 64 is a control rod 80 having a valvular inner end 81 adapted to engage the seat 75 and extend into the channel 76 for the purpose of shutting off the supply of liquid fuel through the outlets 78. The control rod 80 has a lengthwise disposed flat surface 82 on one side thereof which opposes the openings or outlets 78 formed in the body part 65 of the element 64. The upper end of the control rod 68 is positioned a substantial distance above the extension 68 and is bifurcated as at 83. Extending through the furcation is the rocker arm 39. A yoke shaped member 85 has one of its arms extend through the upper end of the control rod 80 and such arm provides a pivot for the rocker arm 39. The other arm of the yoke shaped member 85 also extends through the control rod 80 below its bifurcated upper portion 83 and provides a stop for a purpose to be presently referred to. The upper arm of the yoke shaped member 85 is indicated at 86 and its lower arm at 87.

Fixedly secured to the member 32, by the holdfast device 88 is a longitudinally extending yoke shaped spring 89 through which control rod 80 extends. The spring 89 has the arms thereof bear upon the lower arm 87 of the yoke shaped member 85. The arms of the spring 89 are indicated at 90. The spring 89 acts as a means to maintain the valvular lower end of the control rod 80 against the seat provided at the lower end of the channel 74 to insure a positive shut off of the fuel to the outlets 78 when the motor is not running.

Threadedly engaging with the wall of the opening 10 is an adjustable low throttle head post 91 upon which the rocker arm 30 counterbalances and this will be hereinafter more fully referred to. Carried by the top wall of the housing 1 is an adjustable element 92 which is associated with the throttle 43 and functions as a means for holding the throttle valve 43 open for proper idling speed. The rocker arm 39 has one end arranged over the post 60. The rocker arm 39 is arranged directly over the post 91 and also the head 59. Secured to each side of the body part 65 and extending at an inclination with respect to each other is a pair of wings 93 which function to concentrate the air in each of the grooves on each side of the ports 78 of the atomizing element 65. An actuating means for the shaft 42 is indicated at 94.

Secured in the opening 18 is a flexible tubing 95 through which extends a primer wire 96 and the latter is attached to an angled shaped primer rod 97 which is slidably mounted to the opening 17. The primer rod 97 is provided with an upper and a lower adjustable stop 98, 99 respectively, the former being arranged above the enlarged portion 16 of the extension 15 and the latter below the said enlarged portion 16. The tubing 95 is secured to the enlarged portion by the set screw 100.

The stop 98 is arranged below said end of the rocker arm 39 positioned at the closed end of the housing 1.

The extension 52 of the valve 51 is disposed centrally of the top of the valve body and projects a substantial distance above the top wall 5 of the housing 1.

The form shown in Figures 5 and 6 is the same as that referred to in connection with the device as illustrated in Figures 1 to 4, with this exception that an air vent referred to generally at 101 is provided for the mixing chamber 63. The air vent 101 consists of a tubular body 102 closed at its upper end as at 103 and open at its lower end as at 104. The lower end of the body 102 is secured to the bottom 6 of the housing 1. Ports are provided in the body 102, as at 105. The ports 105 constitute outlets and are arranged in alignment with the grooves formed on the body part 65 of the atomizing element 64. The vent 101 concentrating through the atomizing element insures a constant and flexible graduation of air while the intake valve 51 is admitting a graduating volume of air. This makes a compound atomizing force around the vent 101, through the grooves in the atomizing element 64.

The control rod 80 functions to automatically control the fuel at the proper amount from the entire shut off graduating up and to the full amount required for the various speeds and power of the engine or motor. The control rod permits the fuel to properly control the amount to be discharged or injected through the atomizing element, into the mixing chamber.

With respect to the operation of the device the first automatic movement of the fuel control is that the actuating element 40 is drawn down a movement of one-sixteenth of an inch by the diaphragm due to the suction of the motor, as it starts to turn over, pulling the rocker arm 39 so that the latter will counter-balance from the low throttle adjustable head post 91, lifting control rod 80, as rocker arm 39 will swing on pivot 86, thereby giving the proper fixed amount of fuel to be atomized for proper combustion of the low throttle in accordance with the amount of suction given by throttle valve 43 at idling speed, which is held open for proper idling speed by the adjustable stop 92. As throttle valve 43 is opened for increased speed and power of the motor, the suction through the mixing chamber is greater, taking in more air and automatically lifting intake valve 51, which carries upward the rear end of rocker arm 39 due to the contact of the head 59 with such end increasing the fuel flow in proper proportions equal to the amount of volume intake pressure on the intake valve 51. The proper amounts of fuel are controlled by the change of the lift leverage and the different lengths of adjustment of the lifting element 56. The head 59 automatically follows along the under side of the rocker arm 39. As the motor requires the various amounts of air, the fuel is automatically equalized in the counter-balance of the rocker arm 39. For example, when the motor throttle is open to full capacity the motor is pulling a load at its best and still more pull is added, pulling down the speed and lessening the amount of suction a less amount of air will enter the mixing chamber and automatically the rocker arm 39 lowers the control rod 80, holding back on the fuel pressure at the base of the atomizing element 64.

After the throttle valve 43 is allowed to close to low speed or idling position, the rocker arm 39 drops down on low throttle adjustment head post 91, giving the motor the proper amount of fuel for low throttle. When the motor stops, suction on diaphragm 37 releases the rocker arm 39 and centrally balances on the control rod 80, shutting off the flow of the fuel instantly.

In starting when the motor is cold, the primer wire is pulled to lift primer rod 97 whereby the stop 98 will engage one end of the rocker arm 39 lifting such end and the rocker arm counter-balances on pivot 86 and contacts head post 60, clearing head 59 until the motor starts, thus permitting the maximum amount of air to enter the mixing chamber with the minimum amount of fuel. When rocker arm 39 is elevated by the stop 98, the control rod 80 is moved from the valve seat 75, that is the valved end of said rod instantly permitting a discharge of fuel from the atomizing element 64 as the motor is ready to be started, thus affording instant starting. The priming operation does not shut off the air but holds the control rod up and delivers adjustable amount of the fuel by the upper collar or stop 98 and the upward movement of the rod 97 is arrested by the lower collar of stop 97, so as to give about twice the amount of fuel at idling speed of motor as that of diaphragm control amount set by the post 91 when the motor is warm.

This feature of leverage adjustment on the fuel pressure affords a wonderful quick starting with full capacity of air at all times when in operation, thus a cold motor can be operated from the start with the primer in operation affording a quick get away at high speed under power without racing the motor as is done with a carbureter. It does not load the motor with raw fuel without proper air to accompany it through the atomizer.

In carburetion, the fuel is lifted off a level which is fed by a float and the only way to get extra fuel into the mixing chamber is to throw resistance on the air capacity, thus killing the power greatly needed when the temperature of the motor is low. When the motor is warm, push down on primer wire which releases the upper collar from the under side of rocker arm 39 permitting actuating element 40 to hold rocker arm 39 down on low throttle head post 91. This movement is the automatic control.

In the operation of the device suction is constantly pulling down on rocker arm 39 by the actuating element 40 which is coupled with the diaphragm 37.

The control rod 80 has the tapered beveled portion at its lower end and not only seating for the purpose of shutting off the flow of fuel to the channel 74, but also to graduate the increase of fuel pressure through the atomizing element 64. When the throttle valve 43 is open, air is drawn into the mixing chamber through the lifting of the intake valve 51 and the rocker arm 39 will engage with the head 59, lifting control rods 80 permitting fuel pressure to increase along the flat side of control rod 80, expelling fuel through the outlets 78 to the bottom of the grooves in the element 64 and from there into the mixing chamber 63.

The control rod 80 functions to automatically control the fuel pressure to the atomizing element 64 from the entire shut off in proper proportions required and again automatically shut off the fuel when the motor stops and automatically turns on the fuel when the motor is started.

The arrangement of the diaphragm provides for an automatic suction control for the the fuel, as the diaphragm controls the operation of the actuating element. The diaphragm being operated from normal by the suction of the motor.

What I claim is:—

1. In an automatically controlled fuel atomizing device for internal combustion motors, means to provide a mixing chamber adapted to communicate with the intake manifold of the motor, said means including a suction operated air intake valve and a throttle valve, said valves providing opposed walls of said chamber, a tubular atomizing element having outlets opening into said chamber and intakes arranged exteriorly of said chamber and adapted to communicate with a liquid fuel supply, means for automatically controlling said atomizing element and including a suction controlled diaphragm and a control rod operated from the latter, said rod operating in said element and formed with a flat surface opposing said outlets, said element having a valve seat between said intakes and outlets, and said rod having a valvular end for engagement with said seat to close communication between said intakes and outlets.

2. In an automatically controlled fuel atomizing device for internal combustion engines, means to provide a mixing chamber adapted to communicate with the intake manifold of the engine, said means including a suction operated air intake valve and a throttle valve, said valves providing opposed walls of said chamber, said throttle valve normally closing said mixing chamber to the intake manifold of the engine, an atomizing element extending through said chamber and provided intermediate the ends with superposed spaced lateral outlets opening in to said chamber and lateral intakes below the chamber for communication with a liquid fuel supply, a control rod for and operating in said element, said rod normally closing said intakes to said outlets, and means for operating said rod to provide for the priming of the engine and including a pair of vertically movable simultaneously shiftable stops and a rocker arm.

3. An automatically controlled fuel atomizing device for internal combustion motors comprising a housing provided with a suction chamber for communicating with the intake manifold of the motor, a suction operated intake valve and a throttle valve opposing each other, arranged within the housing and providing in connection with the latter a mixing chamber for communication with the suction chamber, said throttle valve normally closing said suction chamber to said mixing chamber, a tubular atomizing element extending through the mixing chamber and having lateral superposed outlets intermediate its ends opening into the latter and intakes below the mixing chamber for communication with a liquid fuel supply, means for shifting said throttle valve to and from closed position, a shiftable control element for and operating in said atomizing element, means carried by the housing and including a suction controlled diaphragm for automatically operating and controlling the shifting movement of said control element, and adjustable means carried by said housing for controlling the operation of said controlling means.

4. An automatically controlled fuel atomizing device for internal combustion motors comprising a housing provided with a suction chamber for communicating with the intake manifold of the motor, a suction operated intake valve and a throttle valve opposing each other, arranged within the housing and providing in connection with the latter a mixing chamber for communication with the suction chamber, said throttle valve normally closing said suction chamber to said mixing chamber, a tubular atomizing element extending through the mixing chamber and having lateral superposed outlets intermediate its ends, opening into the latter and intakes below the mixing chamber for communication with a liquid fuel supply, means for shifting said throttle valve to and from closed position, a shiftable control element for and operating in said atomizing element, means carried by the housing and including a suction controlled diaphragm for automatically operating and controlling the shifting movement of said control element, and adjustable means carried by said housing for controlling the operation of said controlling means, said suction operated means including a rocker arm pivotally connected to said shiftable control element, and adjustable means carried by said housing for controlling the operation of said rocker arm.

5. In an automatically controlled fuel atomizing device for internal combustion motors, means to provide a mixing chamber for communication with the intake manifold of the motor, said means including a suction operated air intake valve and a shiftable throttle valve arranged in spaced relation and providing opposed walls of said chamber, said throttle valve normally closing said chamber to the intake manifold, a channeled atomizing element extending through said chamber and provided with a set of spaced circumferentially extending peripheral grooves, the base of each groove being apertured to provide an outlet, said outlets opening into the channels of said element and into said chamber, said element further including intakes arranged exteriorly of said chamber and communicating with the channel of said element and adapted to communicate with a source of fuel supply, and suction operated means for automatically controlling the outlets of said atomizing element.

6. In an automatically controlled fuel atomizing device for internal combustion motors, means to provide a mixing chamber for communication with the intake manifold of the motor, said means including a suction operated air intake valve and a shiftable throttle valve arranged in spaced relation and providing opposed walls of said chamber, said throttle valve normally closing said chamber to the intake manifold, a channeled atomizing element extending through said chamber and provided with a set of spaced circumferentially extending peripheral grooves, the base of each groove being apertured to provide an outlet, said outlets opening into the channels of said element and into said chamber, said element further including intakes arranged exteriorly of said chamber and communicating with the channel of said element and adapted to communicate with a source of fuel supply, suction operated means for automatically controlling the outlets of said atomizing element, and oppositely disposed inclined wings connected to said element and directed towards said intake valve.

7. In an automatically controlled fuel atomizing device for internal combustion motors, means to provide a mixing chamber adapted to communicate with the intake manifold of the motor, said means including a suction operated air intake valve and a throttle valve, said valves providing opposed walls of said chamber, a tubular atomizing element having intermediate its ends lateral outlets opening into said chamber and intakes arranged exteriorly of said chamber and adapted to communicate with a liquid fuel supply, means including a suction controlled diaphragm and a rod operated from the latter for automatically controlling said atomizing element, said control rod operating in said element, and an air vent extended into said mixing chamber and having outlets discharging towards said atomizing element.

8. An automatically controlled fuel atomizing device for internal combustion motors comprising a housing provided with a suction chamber for communicating with the intake manifold of the motor, a suction operated intake valve and a throttle valve opposing each other, arranged within the housing and providing in connection with the latter a mixing chamber for communication with the suction chamber, said throttle valve normally closing said suction chamber to said mixing chamber, a tubular atomizing element extending through the mixing chamber and having outlets opening into the latter and intakes arranged exteriorly of the mixing chamber for communication with a liquid fuel supply, means for shifting said throttle valve to and from closed position, a shiftable control element for and operating in said atomizing element, suction operated means carried by the housing for automatically operating and controlling the shifting movement of said control element, and an air vent extended into said mixing chamber and having outlets discharging towards said atomizing element.

9. In an automatically controlled fuel atomizing device for internal combustion motors, means to provide a mixing chamber adapted to communicate with the intake manifold of the motor, said means including a suction operated air intake valve and a throttle valve, said valves providing opposed walls of said chamber, a tubular atomizing element having intermediate its ends lateral outlets opening into said chamber and intakes arranged exteriorly of said chamber and adapted to communicate with a liquid fuel supply, means including a suction controlled diaphragm and a rod operated from the latter for automatically controlling said atomizing element, said control rod operating in said element, adjustable stops for said valves, and an air vent extended into said mixing chamber having outlets discharging towards said atomizing element.

10. An automatically controlled fuel atomizing device for internal combustion motors comprising a housing provided with a suction chamber for communicating with the intake manifold of the motor, a suction operated intake valve and a throttle valve opposing each other, arranged within the housing and providing in connection with the latter a mixing chamber for communication with the suction chamber, said throttle valve normally closing said suction chamber to said mixing chamber, a tubular atomizing element extending through the mixing chamber and having intermediate its end lateral outlets opening into the latter and in proximity to its lower end intakes arranged exteriorly of the mixing chamber for communication with liquid fuel supply, means for shifting said throttle valve to and from closed position, a shiftable control element for and operating in said atomizing element, means carried by the housing and including a suction controlled diaphragm operatively connected with and for automatically operating and controlling the shifting movement of said control element, and adjustable stops for said valves.

11. In an automatically controlled fuel atomizing device for internal combustion motors, means to provide a mixing chamber adapted to communicate with the intake manifold of the motor, said means including a suction operated air intake valve and a throttle valve, said throttle valve normally closing said chamber to the intake manifold, a fuel atomizing element opening into said chamber in a direction to said throttle valve, means including a suction controlled diaphragm located adjacent the said chamber and a control rod operated from the diaphragm and extending into said element for automatically controlling the latter, and a pair of oppositely inclined wings extending from said element towards said intake valve for concentrating the incoming air with respect to said element.

12. In an automatically controlled fuel atomizing device for internal combustion motors, means to provide a mixing chamber adapted to communicate with the intake manifold of the motor, said means including a suction operated air intake valve and a throttle valve, said throttle valve normally closing said chamber to the intake manifold, a fuel atomizing element opening into said chamber in a direction to said throttle valve, means including a rocker arm, a suction controlled diaphragm located adjacent said mixing chamber and a control rod operated from the diaphragm and extending into said element for automatically controlling the latter, and means engaging with said rocker arm for shifting said rod for priming the motor.

13. In an automatically controlled fuel atomizing device for internal combustion motors, means to provide a mixing chamber adapted to communicate with the intake manifold of the motor, said means including a suction operated air intake valve and a throttle valve, said throttle valve normally closing said chamber to the intake manifold, a fuel atomizing element opening into said chamber in a direction to said throttle valve, suction operated means extending into said element for automatically controlling the latter, and an air vent extended into said chamber and through said air concentrating means, said vent having outlets directed towards said atomizing element.

14. In an automatically controlled fuel atomizing device for internal combustion motors, means to provide a mixing chamber adapted to communicate with the intake manifold of the motor, said means including a suction operated air intake valve and a throttle valve, said throttle valve normally closing said chamber to the intake manifold, a fuel atomizing element opening into said chamber in a direction to said throttle valve, suction operated means extending into said element for automatically controlling the latter, means extending from said element towards said intake valve for concentrating the incoming air with respect to said element, and an air vent extended into said chamber and through said air concentrating means, said vent having outlets directed towards said atomizing element.

In testimony whereof, I affix my signature hereto.

CARL F. CAPELL.